United States Patent Office 3,190,878
Patented June 22, 1965

3,190,878
COATING COMPOSITION COMPRISING VINYL CYCLIC ACETAL, AN ORGANIC COBALT SALT AND A VINYL POLYMERIZATION INITIATOR
Carol K. Ikeda, Wallingford, Pa., assignor to E. I. du Pont de Nemours and Company, Wilmington, Del., a corporation of Delaware
No Drawing. Filed May 2, 1960, Ser. No. 25,857
22 Claims. (Cl. 260—23.5)

This application is a continuation-in-part of my copending application Serial No. 737,509, filed May 26, 1958, and now abandoned.

This invention relates to a novel method of polymerizing certain vinyl cyclic acetal compounds, particularly in the form of coatings or films. It also relates to polymerizable compositions containing these compounds, and to articles coated therewith.

As used throughout the specification and claims, the term "vinyl cyclic acetal compound," and the further abbreviated term "vinyl compound," are intended to mean a compound characterized by the presence of a plurality of radicals having the following structural formula:

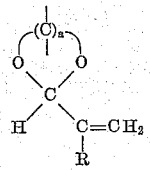

in which

represents carbon atoms in the ring, "$a$" being an integer having a value of at least 2, all but 1 (i.e. $2a-1$) of the valences of said carbon atoms being satisfied by monovalent radicals of the class consisting of hydrogen, alkyl, aryl, alkaryl, aralkyl, chloroalkyl, fluoroalkyl, alkoxyalkyl, chloroalkoxyalkyl, fluoroalkoxyalkyl, cyanoalkoxyalkyl, cyanoalkyl, alkenyl, chloroaryl and fluoroaryl when the value of "$a$" is 2, and consisting additionally of fluoro, chloro, cyano, acylamido and phenylsulfonyl when the value of "$a$" is greater than 2; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy and carbalkoxy. The unsatisfied valence of one of the carbon atoms in the chain represented by

is the valence through which the cyclic radical is connected to the remainder of the compound.

The term "polymerize" as used herein designates the conversion of these vinyl cyclic acetal compounds, and paints and other compositions containing them, to a substantially tack-free or "dry" solid state. Such conversion occurs in the presence of air or oxygen, and the time required is referred to as "tack-free-time." It is not uncommon for the polymerized vinyl compounds to be substantially insoluble in solvents which readily dissolve the initial vinyl compounds.

Films and other thin bodies of compositions containing the specified vinyl compounds will readily polymerize in air at elevated temperatures, e.g. 200° F., if a suitable amount of a siccative cobalt salt is first added to the compositions. However, attempts to polymerize films of such compositions at room temperature, or "moderate" temperatures in the range of about 40 to 120° F., have met with troublesome problems. Inconsistent and slow rates of polymerization have been the chief difficulty.

Various amounts of residues which tend to inhibit polymerization at moderate temperatures appear to be inherent in the vinyl cyclic acetal compounds which are produced from commercial grade reactants. This problem has previously been overcome by subjecting the original reactants or the final compound to an expensive purification process.

Another serious problem encountered in polymerizing the films at moderate temperatures has been the retarded rate of conversion obtained when certain common pigments and other additives are present in the composition.

A further important problem has been the fluctuation of tack-free-time more or less in proportion to the age of the vinyl cyclic acetal compound. That is, the polymerization has occurred at a faster rate with aged compound than with fresh compound. Obviously, it is a great inconvenience to use only those batches of vinyl compound which have aged for a predetermined period of time.

It is therefore the primary object of this invention to provide compositions derived from the vinyl cyclic acetal compounds which will polymerize at a controllable and relatively rapid rate at moderate temperatures, especially room temperature.

It is also an object to provide a method for moderate temperature conversion of the vinyl compounds which is relatively unaffected by such factors as the age of the compounds, the presence of inhibitory residues inherent in the compounds, and the presence of additives such as certain common pigments.

Other important objects will become apparent from the following description of the invention.

I have made the surprising discovery that these objects can be accomplished by adding to the vinyl cyclic acetal compound a small amount of an organic cobalt salt and a free radical-producing vinyl polymerization initiator. The cobalt salt, as defined later in more detail, can be a cobalt(ous) salt of a half ester of a dicarboxylic acid or a cobalt(ous) salt of a monocarboxylic acid.

The free radical-producing vinyl polymerization initiators, as defined later in more detail, are well known in the polymerization art where they are also referred to as "catalysts." Organic peroxides and hydroperoxides are representative of this class along with many other materials set forth hereinafter.

When a coating, film or other thin body of the resulting mixture (i.e., vinyl cyclic acetal compound, cobalt salt and free radical type initiator) is exposed to air at moderate temperature, say about 40 to 120° F., it polymerizes at a reproducibly rapid rate.

A better understanding of the invention will be had from the following detailed description and claims.

The following specific examples are given with the intention of illustrating but not limiting the invention. All parts and percents shown are by weight unless specified otherwise.

EXAMPLE 1

A red paint is prepared by mixing together 18.3 parts of toluidine red, 73.2 parts of bis(2-vinyl-1,3-dioxolane-4-butyl) isophthalate, 1.46 parts of coconut alkyd resin and 7.0 parts of solvent. To this mixture is added, with stirring, sufficient cobalt naphthenate drier (in solution form), to yield a metallic cobalt content of 0.1% based on the combined weight of vinyl compound and alkyd resin, that is, by weight of "binder." Sufficient tertiary butyl hydroperoxide is also stirred into the mixture in the amount of 0.8% by weight of binder.

A film of the resulting paint is cast on a glass plate by means of a 4.2 mil doctor knife applicator. The film becomes substantially tack-free and insoluble in less than 28 hours of exposure to air at about 75° F.

For purposes of comparison, a sample of the above formula without the t-butyl hydroperoxide is cast in a like manner. It takes this control sample about 40 hours to become tack-free.

EXAMPLE 2

A black paint is prepared by mixing together 5.95 parts of carbon black, 85.0 parts of bis (2-vinyl-1,3-dioxolane-4-butyl) isophthalate, and 9.05 parts of solvent. To this mixture are added 0.1% metallic cobalt as cobalt naphthenate and 0.8% of t-butyl hydroperoxide, both percentages based on the weight of the vinyl compound.

A film of the resulting paint, cast in the same manner as that of Example 1, has a tack-free-time of less than 28 hours. When the t-butyl hydroperoxide is omitted from this paint, its tack-free-time is over 7 days.

EXAMPLE 3

A red paint is prepared by mixing the following: 14.5 parts of toluidine red, 41.5 parts of bis(2-vinyl-1,3-dioxolane-4-butyl) orthophthalate, 14.0 parts of soya alkyd resin, and 30.0 parts of solvent. Based on the weight of binder, 0.05% of cobalt metal as cobalt octoate and 0.8% of t-butyl hydroperoxide are added.

A film of the resulting paint, cast in the same manner as that of Example 1, has a tack-free-time of 14 hours. When the t-butyl hydroperoxide is omitted from this paint it has a tack-free-time of about 20 hours.

EXAMPLE 4

The following ingredients are mixed together: 5.0 parts of carbon black, 61.3 parts of bis (2-vinyl-1,3-dioxolane-4-butyl) orthophthalate, 10.0 parts of soya alkyd resin, and 23.7 parts of solvent. Cobalt octoate and t-butyl hydroperoxide are added in the same proportions as in Example 3. A film of this black paint is cast in the manner of Example 1. The tack-free-time at 75° F. is 14 hours, and that of the control sample is 20 hours.

EXAMPLE 5

Cobalt butyl phthalate and t-butyl hydroperoxide are mixed with bis(2-vinyl-1,3-dioxolane-4-butyl) orthophthalate in such proportions that 0.025% metallic cobalt and 0.5% of the peroxide are present by weight of the vinyl compound. A wet film of the mixture is cast on a glass plate by means of a 2.4 mil doctor knife applicator. The tack-free-time is 6 hrs. at 75° F. When the peroxide is omitted, the tack-free-time is 12 hours.

A tack-free-time of 5 hours in obtained when the peroxide content in the above example is 1.0% and again when it is 5.0%.

EXAMPLE 6

Example 5 is repeated with six samples of the vinyl compound having the following ages: 4 hours, 1 week, 2 weeks, 3 weeks, 4 weeks, and 5 weeks. The tack-free-time is about 6 hours at 75° F. in each case. Control samples, with the peroxide omitted, have tack-free-times varying from about 14 hours for the freshest sample to about 10 hours for the oldest sample.

EXAMPLE 7

Example 5 is repeated with a sample of the vinyl compound from each of 3 different batches of the same age containing the usual amount of inhibitory residues inherent in the commercial grade reactants from which the compound is produced. A duplicate set of these 3 samples is subjected to a purification process whereby substantially all of the inhibitory residues are removed. Both sets of samples are catalyzed and tested for tack-free-time in the manner of Example 5. All six samples have a tack-free-time of approximately 6 hours.

When the t-butyl hydroperoxide is omitted from a similar set of samples, the non-purified samples have tack-free-times of about 12 to 15 hours and the purified samples have tack-free-times of about 8 hours.

EXAMPLE 8

Example 1 is repeated except that cobalt linoleate is substituted for the cobalt naphthenate and cumene hydroperoxide is substituted for the t-butyl hydroperoxide. The film has a tack-free-time of about 28 hours.

EXAMPLE 9

A black paint is produced by first making a mill base from 12.9 parts of lampblack, 25.8 parts of drying oil alkyd resin, and 61.3 parts of solvent. Then 60 parts of the mill base are mixed with 94.8 parts of bis(2-vinyl-1,3-dioxolane-4-butyl) orthophthalate, and 9.9 parts of xylene. Cobalt butyl phthalate equal to 0.05% cobalt metal and 0.8% t-butyl hydroperoxide are then stirred into the composition, both percentages being based on the total weight of binder (vinyl compound plus alkyd).

A film cast from this coating composition with a 4.2 mil doctor knife becomes tack-free in less than 16 hours at 75° F.

A control sample, from which the peroxide is omitted, is still wet and tacky after 16 hours.

EXAMPLE 10

A red paint is produced by first making a mill base from 24 parts of toluidine red, 22 parts of drying oil alkyd resin, and 54 parts of solvent. Then 120 parts of the mill base are mixed with 79.2 parts of bis(2-vinyl-1,3-dioxolane-4-butyl) orthophthalate and 15 parts of xylene. Next, cobalt butyl phthalate and t-butyl hydroperoxide are added in the same proportions used in Example 9.

Tack-free-time of this paint is tested in the same manner and with the same results as in Example 9.

Example 10 is repeated, except the vinyl compound used in that example is replaced with the following compounds:

*Vinyl cyclic acetal compound*

EXAMPLE 11.—Bis(2-vinyl-1,3-dioxolane-4-butyl) azodiformate
EXAMPLE 12.—Bis(2-vinyl-1,3-dioxolane-4-butyl) itaconate
EXAMPLE 13.—Bis(2-vinyl-1,3-dioxolane-4-butyl) acetone dicarboxylate
EXAMPLE 14.—Bis(2-vinyl-1,3-dioxolane-4-butyl) acetamidomalonate
EXAMPLE 15.—Bis(2 - vinyl-1,3-dioxolane-4-butyl) di(cyanoethyl)malonate
EXAMPLE 16.—Bis(2-vinyl-1,3-dioxolane-4-butoxy) diphenyl silane
EXAMPLE 17.—Tris(2-vinyl-1,3-dioxolane-4-butyl) citrate
EXAMPLE 18.—Bis[(2 - vinyl-5-methyl-1,3-dioxan-5-yl)methyl]sebacate

EXAMPLE 19

A red enamel is prepared by grinding together 200 parts of bis (2-vinyl-1,3-dioxolane-4-butyl) orthophthalate, 200 parts of bis (2-vinyl-1,3-dioxolane-4-butyl) itaconate/mesaconate/citraconate ester mixture, 80 parts of toluidine red and 53 parts of xylene, followed by admixing with the resulting dispersion cobalt butyl phthalate in an amount providing 0.1% cobalt metal based on the total binder.

The batch is divided into three equal parts, and benzoyl peroxide (20% solution in dioxane) is added to two of these in amounts providing 1% and 2%, respectively, of benzoyl peroxide based on the total binder.

Coatings (approximately 1.5 mils thick) of the three compositions thus produced become tack-free in air at about 70° F. in the following times:

| Sample: | Tack-free time in hours |
|---|---|
| Control; no peroxide | 20 |
| 1% benzoyl peroxide | 4.75 |
| 2% benzoyl peroxide | 3.75 |

EXAMPLE 20

| | Parts by wt. |
|---|---|
| Bis (2-vinyl-1,3-dioxolane-4-butyl) orthophthalate | 200 |
| Bis (2-vinyl-1,3-dioxolane-4-butyl) itaconate/mesaconate/citraconate ester mixture | 200 |
| Carbon black | 20 |
| Xylene | 53 |
| Cobalt (as cobalt butyl phthalate) | 0.4 |
| Benzoyl peroxide | 4 |

These ingredients are milled and mixed as in Example 19. A 1.5 mil coating dries to a tack-free stage in air at room temperature in about 4.5 hours, in contrast with about 60 hours for the same formula from which the benzoyl peroxide is omitted.

Cobalt and benzoyl peroxide are present in this formula in the proportions of 0.1% and 1% respectively based on the binder.

EXAMPLE 21

This is an example of an improvement in drying properties plus an improvement in gloss produced by this invention:

| | Parts by Wt. | | |
|---|---|---|---|
| | Control | A | B |
| Bis (2-vinyl-1, 3-dioxolane-4-butyl) orthophthalate | 200 | 200 | 200 |
| Bis (2-vinyl-1,3-dioxolane-4-butyl) itaconate | 200 | 200 | 200 |
| Titanium dioxide | 216 | 216 | 216 |
| Xylene | 50 | 50 | 50 |
| Cobalt (as cobalt butyl phthalate) | 0.4 | 0.4 | 0.4 |
| Benzoyl peroxide | 0 | 10 | 20 |

Cobalt is present in these formulas in the proportion of 0.1% based on the binder. Benzoyl peroxide is present in Formulas A and B in the proportions of 2.5% and 5%, respectively, based on the binder.

These ingredients are milled and mixed as in Example 19. Coatings 2.5–3 mils thick dry in air at room temperature in the times tabulated below and have the indicated gloss values:

| | Dust-free Time in Hours | Tack-free Time in Hours | Gloss |
|---|---|---|---|
| Control | 5.5 | 6 | 76 |
| A | 2.75 | 3.75 | 82 |
| B | 2.5 | 3 | 84 |

Gloss is the percentage reflectance of incident light, as determined in a goniophotometer calibrated with a polished black glass standard.

EXAMPLE 22

Clear unpigmented compositions are prepared by mixing the following ingredients:

| | Parts by wt. |
|---|---|
| Bis (2-vinyl-1,3-dioxolane-4-butyl) itaconate | 50 |
| Bis (2-vinyl-1,3-dioxolane-4-butyl) orthophthalate | 50 |
| Cobalt (as cobalt butyl phthalate) | 0.1 |
| Free-radical vinyl polymerization initiator (as 20% solution in benzene) | 1 |

Drying times of such compositions containing various free-radical vinyl polymerization initiators are recorded below, along with the drying time of a control containing no such initiator. The coatings are 1.5–1.7 mils thick, and the test is run in air at room temperature.

| Initiator: | Tack-free time in hours |
|---|---|
| None (control) | 5 |
| t-Butyl hydroperoxide | 4.5 |
| Lauroyl peroxide | 3 |
| Benzoyl peroxide | 3 |
| Cumene hydroperoxide | 4.5 |
| Di-t-butyl peroxide | 4.5 |
| Hydrogen peroxide (as aqueous 30% solution, instead of in benzene) | 3.5 |
| Azobisisobutyronitrile (as 20% solution in acetone, instead of in benzene) | 4.5 |

EXAMPLE 23

| | Parts by wt. |
|---|---|
| Bis (2-vinyl-1,3-dioxolane-4-butyl) fumarate | 50 |
| Bis (2-vinyl-1,3-dioxolane-4-butyl) orthophthalate | 50 |
| Titanium dioxide | 54 |
| Xylene | 12 |
| Cobalt (as cobalt butyl phthalate) | 0.1 |
| Benzoyl peroxide | 1 |

These ingredients are milled and mixed as in Example 19. The tack-free time of a coating dried in air is about 3.5 hours, in contrast with somewhat more than 7 hours for the same formula from which the benzoyl peroxide is omitted.

EXAMPLE 24

The following is an example of a penetrating wood finish of this invention. Such a product is applied to wood, particularly open-grained wood like oak flooring, by brushing or otherwise sopping an excess on the wood, allowing it to stand for 15–30 minutes and finally wiping off the excess while simultaneously evening up the appearance with rags. There results, upon drying, a durable finish embedded in the wood with only a minimum coating on the surface. Additional applications can be made, but a built-up coating is preferably avoided.

| | Parts by wt. |
|---|---|
| 43% soya oil modified alkyd resin (54% solids in hydrocarbon solvents) | 12 |
| Bis (2-vinyl-1,3-dioxolane-4-butyl) itaconate | 327 |
| Bis (2-vinyl-1,3-dioxolane-4-butyl) orthophthalate | 334 |
| Cobalt butyl phthalate solution in xylene (containing 4% cobalt metal) | 25 |
| Aromatic hydrocarbon solvent ("Solvesso" 150) | 163 |
| Benzoyl peroxide (55% paste in benzyl butyl phthalate) | 24 |

This formula contains about 0.15% cobalt and about 2% benzoyl peroxide based on the total binder (first three ingredients). In this and other uses, the free radical initiator helps to overcome slow drying apparently caused by oxygen inhibition in thin coatings and/or by inhibitory substances in certain woods (e.g. red cedar, mahogany, walnut) or in previously phenolic-varnished substrates.

EXAMPLE 25

This is an example of the use of redox catalyst components as the free radical vinyl polymerization initiator in this invention.

| | Parts by wt. |
|---|---|
| Bis (2-vinyl-1,3-dioxolane-4-butyl) orthophthalate | 100 |
| Hydrazine hydrate | 1 |
| t-Butyl hypochlorite | 2 |
| Cobalt (as cobalt butyl phthalate) | 0.05 |

A coating of this composition about 2 mils thick dries in air at room temperature in about 6 hours in contrast with about 10 hours for an analogous composition containing only the bis-orthophthalate and cobalt in the proportions indicated.

EXAMPLE 26

This is an example of the use of various combinations of photoinitiator and actinic (ultraviolet) radiation as free radical vinyl polymerization initiators in this invention.

|  | Parts by Wt. | | | |
| --- | --- | --- | --- | --- |
|  | A | B | C | D |
| Bis (2-vinyl-1,3-dioxolane-4-butyl) itaconate | 100 | 100 | 100 | 100 |
| Cobalt (as cobalt butyl phthalate) | 0.05 | 0.05 | 0.05 | 0.05 |
| Butyraldoxime | 0.02 | 0.02 | 0.02 | 0.02 |
| Benzoin | 2 |  |  |  |
| Uranyl nitrate |  | 0.1 |  |  |
| Riboflavin |  |  | 0.1 |  |

The photoinitiation mechanism is completed by exposing wet coatings (about 2 mils thick) of compositions A, B and C to actinic (ultraviolet) radiation from an artificial electrical source (Hanovia AH–3 Sunlamp) at a distance of eighteen inches perpendicularly from the coatings while otherwise exposing the coatings to air at room temperature in the conventional manner associated with paint drying. The "control" coating D is not irradiated but is otherwise treated the same.

Under these conditions, compositions A, B and C dry tack-free in 2 to 3 hours, whereas D has not reached the tack-free stage in 7 hours.

In each of these examples a tack-free film or coating is obtained in considerably less time than is required when the free radical-producing initiator is absent from the composition.

Ordinarily, it is preferable to apply films of the vinyl cyclic acetal compositions no thicker than about 5 mils so that they will receive sufficient oxygen to polymerize throughout their thickness.

The cobalt salts which are useful in practicing this invention are of two general types. One type includes the cobalt(ous) salts of half esters of dicarboxylic acids. These salts are exemplified by the preferred cobalt butyl phthalate, as well as cobalt methyl adipate, cobalt ethyl sebacate, cobalt butyl succinate, cobalt butyl tetrahydrophthalate and cobalt butyl chlorendate.

The other type of useful cobalt salt includes the cobalt(ous) salts of monocarboxylic or fatty acids, such as the acetate, octoate, naphthenate, linoleate, resinate, tallate, and others of the class ordinarily capable of reducing the tack-free-time of drying oil films exposed to air.

It will be understood by those in the art that it is preferable to dissolve the cobalt salt in a volatile solvent before it is mixed with the vinyl compound. Both measurement and mixing of the salt are thus facilitated.

The amount of cobalt salt to be employed can be varied according to such factors as air temperature during conversion of the film, desired tack-free-time, and nature of the salt. Ordinarily, however, the optimum amount of cobalt salt, expressed as cobalt metal, will fall within the range of about .02% to about 0.1% by weight of air-convertible binder in the composition. Rarely does less than 0.01% or more than 1% of cobalt prove beneficial.

The catalytic components of the room-temperature polymerizable vinyl cyclic acetal compositions made in accordance with this invention must contain, in addition to at least one of the specified cobalt salts, at least one free radical-producing vinyl polymerization initiator. Such initiators are well known in the polymerization art and include, for example, organic peroxides, azo vinyl polymerization initiators, redox vinyl polymerization initiator combinations, and certain other substances known to initiate vinyl polymerization. The mechanism of free radical production and initiation of vinyl polymerization are described in Chapters B and C of "Organic Peroxides," Tobolsky and Mesrobian, Interscience Publishers, Inc., New York, 1954. Although the description therein is given in terms of these mechanisms generally as they relate to peroxides, the same principles apply to azo, redox and other free radical sources disclosed herein.

Illustrative of organic peroxides useful in this invention are alkyl and aralkyl peroxides, alkyl and aralkyl hydroperoxides, peroxyacids, peroxyesters, acyl and aroyl peroxides and peroxy derivatives of aldehydes and ketones, such as benzoyl peroxide, di-t-butyl peroxide, di-alpha-cumyl peroxide, di-t-amyl peroxide, t-butyl hydroperoxide, t-butyl perbenzoate, and isopropyl hydroperoxide. Others are disclosed in "Organic Peroxides," supra, pages 157–173.

Illustrative of azo catalysts useful in this invention are alpha, alpha - azobisisobutyronitrile; alpha, alpha-biscyclohexanecarbonitrile; alpha, alpha'-azobis (alpha, gamma-dimethylvaleronitrile); alpha, alpha'-azobis (cyclopropylpropionitrile); alpha, alpha'-bis (alpha-methyl, gamma-carboxybutyronitile); alpha, alpha'-azobisisobutyramide; and alpha, alpha'--azobis (ethyl isobutyrate).

Illustrative of redox catalysts useful in this invention are sulfinic acid plus benzoyl peroxide, hydrazine plus hydrogen peroxide, thiourea plus hydrogen peroxide, t-butyl hypochlorite plus hydrazine, benzoyl peroxide plus dimethyl aniline, ferrous sulfate plus hydrogen peroxide, ammonium persulfate plus sodium bisulfite, cerous sulfate plus sodium sulfide, sodium hypochlorite plus sodium sulfite, potassium permanganate plus sodium bisulfite, cumene hydroperoxide plus ferrous sulfate, and benzoyl peroxide plus ferrous sulfate.

Illustrative of photoinitiators which are useful in this invention and which function when irradiated with actinic light are benzoin; benzoin methyl ether; fluorescein plus glucose plus oxygen; riboflavin, ferric, ceric, plumbic and uranyl salts; and trioxolatocobaltate complex.

Miscellaneous free radical-producing vinyl polymerization initiators useful in this invention are diethyl percarbonate, diethyl perborate, lead tetraethyl, lead tetraacetate, hydrogen peroxide, sodium peroxide zinc peroxide and substances which produce peroxide in the presence of moisture, for example potassium superoxide.

While all free radical-producing vinyl polymerization initiators can be used, I particularly prefer the organic peroxides and hydroperoxides.

The optimum amount of such initiator for a given situation will depend somewhat on the nature of the vinyl cyclic acetal, the amount of inhibitory substance present and the desired rate of polymerization. At least 0.1% (by weight of air-convertible binder) should be used in any case. More than about 3% is usually unnecessary unless inhibitory additives are present, in which case as much as about 5% might be required. For most uses, the preferred amount of such initiator will be from about 0.5% to about 2%, based on the total weight of vinyl cyclic acetal compound and other air-polymerizable binders in the composition. One skilled in the art of drying oil paints will readily arrive at the best proportion of both the cobalt salt and the free radical-producing initiator to fit a particular set of circumstances.

Additional vinyl cyclic acetal compounds of the class specified for use in practicing this invention are disclosed in my copending applications Ser. No. 683,021, filed Sept. 10, 1957, and now abandoned; Ser. No. 737,506, filed May 26, 1958, now Patent No. 3,010,923; and Ser. No. 737,507, filed May 26, 1958, now Patent No. 3,010,918. In practicing this invention, any of these compounds can be substituted for all or part of the corresponding compound in the foregoing examples.

Likewise, any cobalt salt or free radical-producing initiator disclosed above can be substiuted for all or part of the corresponding material in the foregoing examples in the proportions indicated or in other proportions disclosed hereinbefore.

In addition to the essential vinyl cyclic acetal compound, cobalt salt and initiator, the polymerizable compositions of this invention can also contain such common film formers as vegetable oils, elastomers, oil-modified alkyd resins, oleoresinous varnishes, and synthetic thermoplastic and thermosetting resins. The compositions can also include other well known coating composition additives or modifiers, such as plasticizers, solvents, pigments, surface active agents, and stabilizers. These can be incorporated by the methods and in the proportions common to the coating art.

Films or coatings of the compositions can be applied to various types of substrates, including metal, wood, paper and fabric.

The method of this invention has the advantage of providing a controllably rapid rate of polymerization at moderate temperatures for coatings and other thin bodies containing the vinyl cyclic acetal compounds.

Short and consistent tack-free-times are obtained with both both fresh and aged batches of vinyl cyclic acetal compound, and in spite of the presence therein of certain residues and additives which otherwise retard polymerization. Commercial grade reactants can be used in making the vinyl compound without danger of retarded and fluctuating polymerization rates.

With most of the specified vinyl compounds, the compositions can be stored in closed containers for extended periods after the catalysts are added without serious change in viscosity or polymerizing capacity.

While there are set forth above only a limited number of embodiments of the invention herein presented, it is possible to produce still other embodiments without departing from the inventive concept herein disclosed. The invention is not intended to be limited except as indicated in the appended claims.

I claim:
1. A composition consisting essentially of a vinyl cyclic acetal compound, an organic cobalt salt selected from the class consisting of cobalt(ous) salts of half esters of dicarboxylic acids and cobalt(ous) salts of monocarboxylic acids, and a free radical-producing vinyl polymerization initiator selected from the class consisting of alkyl, aralkyl, acyl and aroyl peroxides, alkyl and aralkyl hydroperoxides, peroxyacids, peroxyesters, peroxyaldehydes, peroxyketones, azo initiators, redox initiators, photoinitiators, lead tetraethyl, lead tetraacetate, hydrogen peroxide, sodium peroxide, zinc peroxide and potassium superoxide; said vinyl cyclic acetal compound being one which contains a plurality of cyclic radicals having the following structural formula:

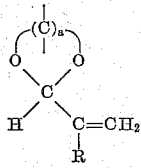

in which

represents carbon atoms in the ring, "a" being an integer having a value of at least 2, in which all but 1 of the valences of said carbon atoms are satisfied by monovalent radicals of the class consisting of hydrogen, alkyl, aryl, alkaryl, aralkyl, chloroalkyl, fluoroalkyl, alkoxyalkyl, chloroalkoxyalkyl, fluoroalkoxyalkyl, cyanoalkoxyalkyl, cyanoalkyl, alkenyl, chloroaryl and fluoroaryl when the value of "a" is 2, and consisting additionally of fluoro, chloro, cyano, acylamido and phenylsulfonyl when the value of "a" is greater than 2, and the one remaining valence connects the cyclic radical to at least one other such cyclic radical through an interposed polyvalent radical; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy.

2. A composition as defined in claim 1 in which said vinyl compound is bis(2-vinyl-1,3-doxolane-4-butyl) isophthalate.
3. A composition as defined in claim 1 in which said vinyl compound is bis-(2-vinyl-1,3-dioxolane-4-butyl) orthophthalate.
4. A composition as defined in claim 1 in which said vinyl compound is bis(2-vinyl-1,3-dioxolane-4-butyl) azodiformate.
5. A composition as defined in claim 1 in which said vinyl compound is bis(2 - vinyl-1,3-dioxolane-4-butyl) itaconate.
6. A composition as defined in claim 1 in which said vinyl compound is bis(2 - vinyl - 1,3-dioxolane-4-butyl) itaconate/mesaconate/citraconate ester mixture.
7. A composition as defined in claim 1 in which said vinyl compound is bis(2 - vinyl - 1,3-dioxolane-4-butyl) fumarate.
8. A composition as defined in claim 1 in which said vinyl compound is bis(2 - vinyl - 1,3-dioxolane-4-butyl) di(cyanoethyl)malonate.
9. A composition as defined in claim 1 in which said vinyl compound is bis(2-vinyl-1,3-dioxolane-4-butoxy) diphenyl silane.
10. A composition as defined in claim 1 in which said vinyl compound is tris(2 - vinyl - 1,3 - dioxolane-4-butyl) citrate.
11. A composition as defined in claim 1 in which said vinyl compound is bis[(2-vinyl-5-methyl-1,3-dioxan-5-yl) methyl] sebacate.
12. A composition as defined in claim 1 in which said cobalt is cobalt butyl phthalate.
13. A composition as defined in claim 1 in which said cobalt salt is cobalt naphthenate.
14. A composition as defined in claim 1 in which said cobalt salt is cobalt octoate.
15. A composition as defined in claim 1 in which said cobalt salt is cobalt linoleate.
16. A composition as defined in claim 1 in which said cobalt salt is present in the amount of about 0.01% to about 1%, expressed as cobalt metal, by weight of said vinyl compound.
17. A composition as defined in claim 1 in which said free radical-producing vinyl polymerization initiator is an organic peroxy compound.
18. A composition as defined in claim 1 in which said free radical-producing vinyl polymerization initiator is an azo compound.
19. A composition as defined in claim 1 in which said free radical-producing vinyl polymerization initiator is a redox combination.
20. A composition as defined in claim 1 in which said free radical-producing vinyl polymerization initiator is a compound activated by acitinic light.
21. A composition as defined in claim 1 in which said "free radical-producing vinyl polymerization initiator" is present in the amount of about 0.1% to about 5% by weight of said vinyl compound.
22. A method of polymerizing a vinyl cyclic acetal compound which comprises (1) incorporating therein an organic cobalt salt selected from the class consisting of cobalt(ous) salts of half esters of dicarboxylic acids and cobalt(ous) salts of monocarboxylic acids and a free radical-producing vinyl polymerization initiator selected from the class consisting of alkyl, aralkyl, acyl and aroyl peroxides, alkyl and aralkyl hydroperoxides, peroxyacids, peroxyesters, peroxyaldehydes, peroxyketones, azo initiators, redox initiators, photoinitiators, lead tetraethyl, lead tetraacetate, hydrogen peroxide, sodium peroxide, zinc peroxide and potassium superoxide and (2) exposing the resulting polymerizable composition to oxygen; said vinyl cyclic acetal compound being one which contains a plurality of cyclic radicals having the following structural formula:

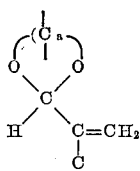

in which

represents carbon atoms in the ring, "*a*" being an integer having a value of at least 2, in which all but 1 of the valences of said carbon atoms are satisfied by monovalent radicals of the class consisting of hydrogen, alkyl, aryl, alkaryl, aralkyl, chloroalkyl, fluoroalkyl, alkoxyalkyl, chloroalkoxyalkyl, fluoroalkoxyalkyl, cyanoalkoxyalkyl, cyanoalkyl, alkenyl, chloroaryl and fluoroaryl when the value of "*a*" is 2, and consisting additionally of fluoro, chloro, cyano, acylamido and phenylsulfonyl when the value of "*a*" is greater than 2, and the one remaining valence connects the cyclic radical to at least one other such cyclic radical through an interposed polyvalent radical; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy.

References Cited by the Examiner
UNITED STATES PATENTS

| | | | |
|---|---|---|---|
| 2,401,776 | 6/46 | Rothrock | 260—67 |
| 3,010,924 | 11/61 | Ikeda | 260—23 |
| 3,010,945 | 11/61 | Ikeda | 260—88.3 |

OTHER REFERENCES

Chatfield: Varnish Substituents, pub. by Leonard Hill Limited, London, 1953, pp. 551 and 552.

LEON J. BERCOVITZ, *Primary Examiner.*

A. D. SULLIVAN, MILTON STERMAN, DONALD E. CZAJA, *Examiners.*

UNITED STATES PATENT OFFICE
CERTIFICATE OF CORRECTION

Patent No. 3,190,878

June 22, 1965

Carol K. Ikeda

It is hereby certified that error appears in the above numbered patent requiring correction and that the said Letters Patent should read as corrected below.

Column 10, line 32, after "cobalt", first occurrence, insert -- salt --.

Signed and sealed this 21st day of December 1965.

(SEAL)
Attest:

ERNEST W. SWIDER
Attesting Officer

EDWARD J. BRENNER
Commissioner of Patents